United States Patent
Ikeguchi et al.

(10) Patent No.: US 11,817,603 B2
(45) Date of Patent: Nov. 14, 2023

(54) FUEL CELL SYSTEM AND ITS CONTROL METHOD

(71) Applicant: NISSAN MOTOR CO., LTD., Yokohama (JP)

(72) Inventors: Ken Bryan Ikeguchi, Kanagawa (JP); Hayato Chikugo, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 17/762,567

(22) PCT Filed: Sep. 24, 2019

(86) PCT No.: PCT/JP2019/037379
§ 371 (c)(1),
(2) Date: Mar. 22, 2022

(87) PCT Pub. No.: WO2021/059351
PCT Pub. Date: Apr. 1, 2021

(65) Prior Publication Data
US 2022/0336831 A1    Oct. 20, 2022

(51) Int. Cl.
*H01M 8/04*         (2016.01)
*H01M 8/04223*    (2016.01)
*H01M 8/04302*    (2016.01)
*H01M 8/04014*    (2016.01)

(52) U.S. Cl.
CPC ... *H01M 8/04268* (2013.01); *H01M 8/04014* (2013.01); *H01M 8/04302* (2016.02)

(58) Field of Classification Search
CPC ......... H01M 8/04268; H01M 8/04302; H01M 8/04014
See application file for complete search history.

(56) References Cited

U.S. PATENT DOCUMENTS

| | | | |
|---|---|---|---|
| 6,586,126 B1 * | 7/2003 | Ogawa | H01M 8/0612 |
| | | | 429/442 |
| 2007/0207356 A1 * | 9/2007 | Miyata | H01M 8/04022 |
| | | | 429/444 |
| 2018/0053950 A1 * | 2/2018 | Buehler | H01M 8/04268 |

FOREIGN PATENT DOCUMENTS

JP    2004-71488 A    3/2004

* cited by examiner

*Primary Examiner* — Olatunji A Godo
(74) *Attorney, Agent, or Firm* — Foley & Lardner LLP

(57) ABSTRACT

A fuel cell system that raises temperature of fuel cells by supplying heated air to the fuel cells during starting up period. The fuel cell system includes a plurality of fuel cells, a fuel supply path connected parallelly to the fuel cells to provide fuel thereto, an air supply path connected serially to the fuel cells to provide air thereto, a heat exchanger arranged in the fuel supply path to heat air or fuel, an air heat exchanger arranged in the air supply path to heat air; and a connection path connecting a position of the air supply path upstream to the air heat exchanger with a position of the fuel supply path upstream to the heat exchanger. A first control valve is arranged in the air supply path for controlling the air flowing into to the air heat exchanger. A second control valve arranged in the connection path for controlling the air flowing into the heat exchanger. The fuel cell system controls opening degrees of the first and second control valves during the start-up period of the fuel cell system to supply heated air to the fuel cells through both the air supply path and the fuel supply path.

8 Claims, 6 Drawing Sheets

FUEL CELL SYSTEM AND ITS CONTROL METHOD

TECHNICAL FIELD

The present invention relates to fuel cell systems and control methods to control the fuel cell systems.

BACKGROUND ART

In a fuel cell system consisting of a plurality of stacks, the fuel supply path providing anode gas, if configured to connect a plurality of fuel cell stacks in series, can feed anode off-gas generated in the upstream fuel cell stacks to the downstream fuel cell stacks. As the anode off-gas contains $H_2O$ and other compounds, feed of anode off-gas from the upstream fuel cell stacks to the downstream fuel cell stacks may affect the system's power generation performance. Therefore, from a viewpoint of avoiding the effect of the anode off-gas from the upstream side fuel cell stacks, the fuel supply path should preferably be connected parallelly to a plurality of fuel cell stacks. On the other hand, if the air supply path carrying cathode gas is connected parallelly to a plurality of fuel cell stacks, this parallel arrangement can produce greater pressure loss than a serial connection arrangement. Therefore, from a viewpoint of reducing the capacity of the air blower for air intake, the air supply path should preferably be connected serially to a plurality of fuel cell stacks.

A configuration of a fuel cell power generation facility is disclosed in JP2004-71488, which is characterized by plural stages of fuel cell parts, serially connected air flow system, and parallelly connected fuel supply system. This fuel cell power generation facility has a heating mean to heat air to an prescribed temperature before the air is supplied from the air supply path to the fuel cell part located on the uppermost flow path.

SUMMARY OF INVENTION

In a case of activating a solid oxide fuel cell system from a resting state, the fuel cell stacks must be warmed up by providing heated air before the system is ready to start partial oxidation reforming reaction (POx). During the start-up period of a fuel cell system having a plurality of fuel cell parts (fuel cell stacks) such as the one described in JP2004-71488, providing heated air for warming up via a serially connected path causes higher temperature elevation in upstream fuel cell stacks than the downstream ones. This may result in larger temperature variations among the plurality of stacks. Power generation under such conditions may result in fluctuated power output and deteriorated power generation efficiency.

In consideration of the above-mentioned problem, this invention aims to provide a fuel cell system capable of suppressing variations of each fuel cell temperature while the system in the process of starting up.

In an aspect of this invention, a fuel cell system configured to warm up a fuel cell by providing heated air thereto during a start-up period is provided. The fuel cell system includes a plurality of fuel cells, a fuel supply path connected parallelly to the fuel cells to provide fuel thereto, an air supply path connected serially to the fuel cells to provide air thereto, a heat exchanger arranged in the fuel supply path to heat air or fuel, an air heat exchanger arranged in the air supply path to heat air, and a connection path connecting a position of the air supply path upstream to the air heat exchanger with a position of the fuel supply path upstream to the heat exchanger. A first control valve is arranged in the air supply path, the first control valve controlling air flowing into the air heat exchanger, and a second control valve is arranged in the connection path, second control valve controlling air flowing into the heat exchanger. The fuel cell system is configure to control opening degrees of the first and second control valves during the start-up period of the fuel cell system to supply heated air to the fuel cells through both the air supply path and the fuel supply path.

DESCRIPTION OF EMBODIMENTS

Hereinafter, certain embodiments of this invention are described referring to figures.

First Embodiment

Figure 1:
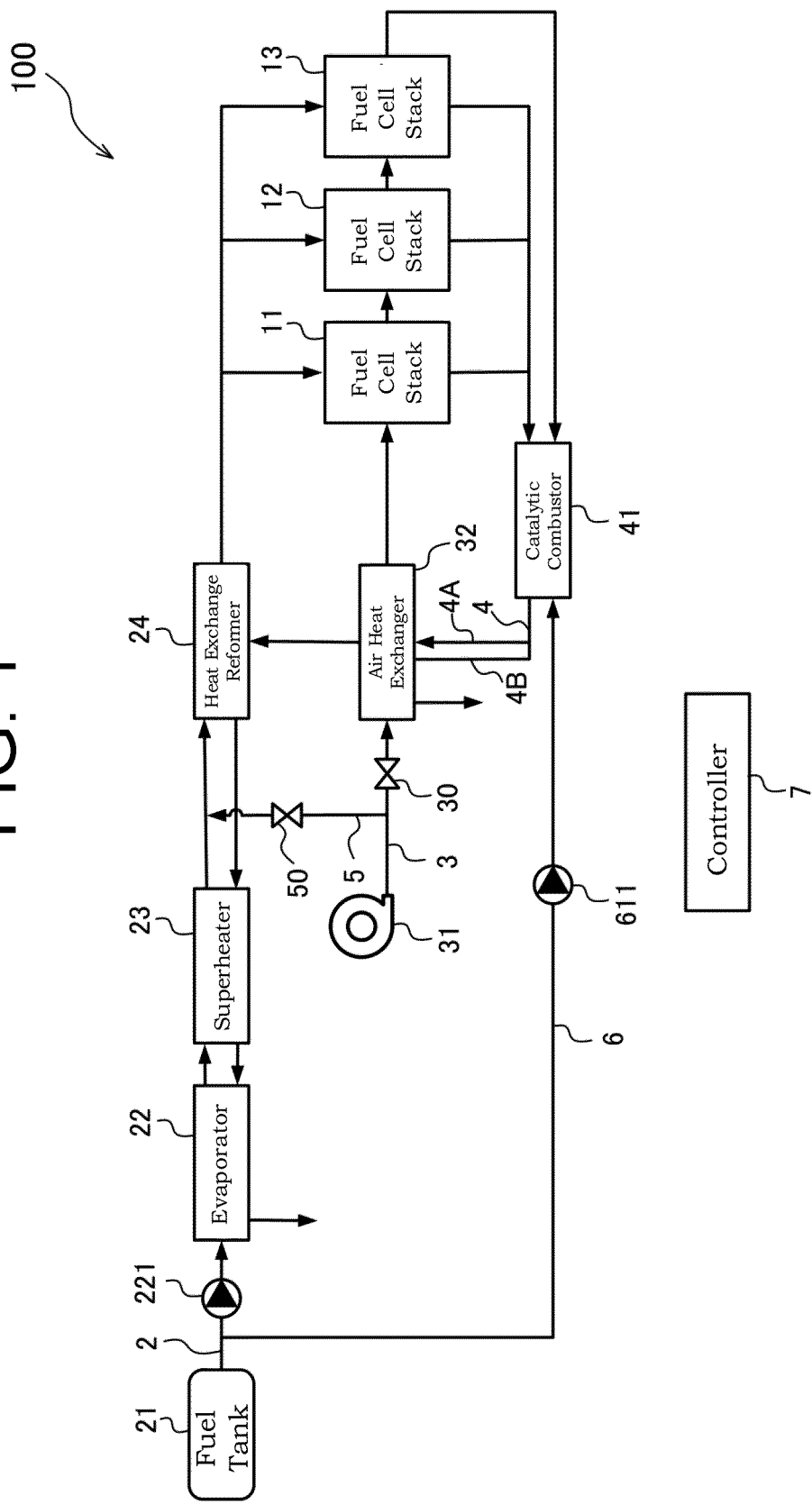
FIG. 1 shows a schematic construction of the fuel cell system that represents the first embodiment of the invention.

FIG. 1 shows schematically the main configuration of the first embodiment of the fuel cell system 100.

The fuel cell system 100 provides fuel gas (anode gas) and oxidizer gas (cathode gas) required to generate electricity to the fuel cell stacks 11, 12, and 13, and makes these fuel cell stacks 11, 12, and 13 to generate the amount of electricity according to the demand from the electric motor and other devices on board the vehicle.

The fuel cell system 100 has a plurality of fuel cell stacks (11, 12, 13), a fuel supply path 2, an air supply path 3, an exhaust path 4, a connection path 5, and a branch path 6. The fuel supply path 2 provides anode gas to the fuel cell stacks 11, 12, and 13, and the air supply path 3 provides the cathode gas to the fuel cell stacks 11, 12, and 13. The exhaust path 4 is used to discharge the anode exhaust gas and cathode exhaust gas from the fuel cell stacks 11, 12, and 13. The connection path 5 connects the air supply path 3 to the fuel supply path 2. The fuel cell system 100 is equipped with a controller 7 (control unit) for controlling the overall operation of the system.

The fuel cell stacks 11, 12, and 13 generates electricity by receiving the supply of anode gas and cathode gas. Each of the fuel cell stacks (11, 12, 13) is constituted by stacking a plurality of fuel cells or fuel cell unit cells, and each of the fuel cells (power generator) is, for example, a solid-oxide fuel cell (SOFC).

The fuel cell stacks 11, 12, and 13 are connected parallelly to the fuel supply path 2, and are connected serially to the air supply path 3. The fuel supply path 2 provides anode gas to each of the anode electrodes of the fuel cell stacks 11, 12, and 13, and the air supply path 3 provides cathode gas to each of the cathode electrodes of the fuel cell stacks 11, 12, and 13. The exhaust gas (both from anode and cathode) discharged from the fuel cell stacks 11, 12, and 13 is burnt in the catalytic combustor 41—to be described further in later sections—and routed to external atmosphere through the exhaust path 4.

A temperature sensor (not shown in figures) is installed in the vicinity of the cathode electrode outlet of each of the fuel cell stacks 11, 12, and 13 to detect the cathode exhaust gas temperature discharged from the fuel cell stacks 11, 12, and 13. Detected temperature is sent to the controller 7 as a signal.

Although three fuel cell stacks are implemented in this embodiment, the number of the fuel cell stacks is not restricted to this but can be any as long as the number is greater than one.

As described further in later paragraphs, the fuel supply path 2 provides heated air instead of anode gas during the start-up period of the fuel cell system 100. Namely, both the fuel supply path 2 and the air supply path 3 provide heated air to warm up (elevate temperature of) the fuel cell stacks 11, 12, and 13.

Several units are arranged along the fuel supply path 2 in series from up to downstream—a fuel tank 21, an injector 221, an evaporator 22, a superheater 23, and a heat exchange reformer 24—and a branch path 6 is arranged in the upstream side of the injector 221. The fuel supply path 2 is connected parallelly to the fuel cell stacks 11, 12, and 13 in the downstream side of the heat exchange reformer 24, and is also connected to the catalytic combustor 41 located in the downstream side of the fuel cell stacks 11, 12, and 13. The fuel supply path 2 fulfils a dual role: as the path to provide anode gas to each anode electrode of the fuel cell stacks 11, 12, and 13, and as the path to flow the anode exhaust gas discharged from the electricity generation reaction to the catalytic combustor 41.

The fuel tank 21 stores pre-reform raw fuel such as a fuel consisting predominantly of ethanol and water. The pump (not shown in figures) is used to provide the raw fuel from the fuel tank 21 to the injector 221, and the injector 221 injects a controlled amount of raw fuel into the evaporator 22. Both the amount of fuel provided by the pump, and the amount of fuel injection by the injector 221 can be controlled by the controller 7.

The liquid fuel is atomized while being injected from the injector 221, and then heated by the evaporator 22 to form the pre-reform fuel gas consisting of ethanol gas and water vapor. The evaporator 22 utilizes the heat of exhaust gas from the catalytic combustor 41 to evaporate the fuel.

The superheater 23 superheats the pre-reform fuel gas by exchanging heat with the combustion gas from the catalytic combustor 41.

The pre-reform combustion gas is further heated up while flowing through the heat exchange reformer 24, wherein heat is exchanged between the pre-reform combustion gas and the combustion gas from the catalytic combustor 41, thus reforming the pre-reform combustion gas into a state suitable to be fed to the fuel cell stack 1. For example, the heat exchange reformer 24 uses reforming catalyst (not shown in figures) to perform steam reforming of the pre-reform combustible gas to produce anode gas consisting mainly of hydrogen. The anode gas reformed in this way is provided while retained in a high-temperature state from the fuel supply path 2 to the anode of the fuel cell stack 1.

Note that, in this embodiment, the heat exchange reformer 24 includes both a heat exchanger and a reformer integrated in a single unit, but the heat exchanger and the reformer may be separately arranged as two independent units.

During the start-up period of the fuel cell system 100, as described in later paragraphs, the air flowing into the heat exchange reformer 24 from the air supply path 3 via the connection path 5 is heated through heat exchange with the combustion gas generated in the catalytic combustor 41. In other words, during a start-up period of the system, the heat exchange reformer 24 functions as a heat exchanger for heating the air.

The heated air is provided to the fuel cell stacks 11, 12, and 13 to warm up these stacks.

The branch path 6 provides a passage of fuel supply to the catalytic combustor 41 (described further in later paragraphs) during a warm-up and other periods. The branch path 6 branches off from the fuel supply path 2 at a position located downstream of the fuel tank 21 and upstream of the injector 221 and is connected to the catalytic combustor 41. An injector 611 is arranged in the branch path 6, and liquid fuel is provided to the injector 611 while, for example, the fuel cell system 100 is in the process of warming up. The injector 611 injects the liquid fuel provided into the catalytic combustor 41 as the fuel of combustion. The injection volume of the injector 611 can be controlled by the controller 7.

Along the air supply path 3, three units are arranged sequentially from the upstream—an air blower 31, a control valve 30 (the first control valve), and an air heat exchanger 32—and a connection path 5 branches off at a position upstream of the control valve 30. The air supply path 3 is, in the downstream side of the air heat exchanger 32, connected serially to the fuel cell stacks 11, 12, and 13 in this sequence, and the outlet path from the fuel cell stack 13 located in the most downward side is connected to the catalytic combustor 41. The air supply path 3 fulfils a dual role: as the path to provide cathode gas to each cathode electrode of the fuel cell stacks 11, 12, and 13, and as the path to flow the cathode exhaust gas discharged from the electricity generation reaction to the catalytic combustor 41.

An air blower 31 is arranged at the inlet of the air supply path 3 to introduce external atmosphere (air) through a filter (not shown in figures) and force-feed the air into the air supply path 3.

The air heat exchanger 32 adds heat to the air provided by the air blower 31 through heat exchange with the combustion gas generated in the catalytic combustor 41 described later. The air heated by the air heat exchanger 32 is fed to the cathode electrodes of the fuel cell stacks 11, 12, and 13.

The volume of air flowing from the air blower 31 to the air heat exchanger 32 is controlled by adjusting the degree of opening of the valve 30 (the first control valve) arranged in the upstream side of the air heat exchanger 32. The degree of opening of the control valve 30 can be controlled by the controller 7.

The objective of placing the connection path 5 is to provide air (oxygen) to pre-reform fuel flowing through the fuel supply path 2; for this purpose, upstream side of the air heat exchanger 32 (in air supply path 3) and upstream side of the heat exchange reformer 24 (in fuel supply path 2) are connected. The connection path 5 branches off from the air supply path 3 at a position between the air blower 31 (downstream side) and the control valve 30 (upstream side) and is connected to upstream side of the heat exchange reformer 24 arranged in the fuel supply path 2. In the connection path 5, a control valve 50 (the second control valve) is installed, the opening thereof is adjusted to control the air flow from the air supply path 3 to the heat exchange reformer 24. Opening of the control valve 50 can be controlled by the controller 7. Supply of air (oxygen) to the pre-reform fuel via the connection path 5 promotes partial oxidation reforming reaction (POx) inside the heat exchange reformer 24, resulting in a temperature rise of reformed anode gas. As a result of supplying heated anode gas to the fuel cell stacks 11, 12, and 13, the temperatures of these fuel cell stacks also rise.

Note that, during a start-up period of the fuel cell system 100, the heat exchange reformer 24 has not yet been sufficiently warmed up to enables the partial oxidation reforming reaction (POx) to occur. During the start-up period of the fuel cell system 100, the air flowing from the air supply path 3 to the fuel supply path 2 via the connection path 5 is heated in the heat exchange reformer 24 through heat exchange with the combustion gas from the catalytic combustor 41. The air heated in this way is provided by way of the air supply path 3 to the fuel cell stacks 11, 12, and 13, resulting in the warming up of these stacks to rise. Thus, during the start-up period of the fuel cell system 100, the fuel cell stacks 11, 12, and 13 are warmed up by heated air from two sources: from the air supply path 3, and from the fuel supply path 2.

The anode exhaust gas and cathode exhaust gas from the fuel cell stacks 11, 12, and 13 are further burnt in the catalytic combustor 41, and the resulting combustion gas is discharged to the exterior through the exhaust path 4. The exhaust path 4 is branched into two paths: the first exhaust path 4A connecting the catalytic combustor 41 to the exterior of the system, and the second exhaust path 4B branching off from the first exhaust path 4A in the downstream side of the catalytic combustor 41 to connect to the system exterior.

The anode exhaust gas and cathode exhaust gas generated in the fuel cell stacks 11, 12, and 13 flows through the fuel supply path 2 and air supply path 3 into the catalytic combustor 41, where the gases are mixed and catalytically burned producing a combustion gas composed primarily of carbon dioxide and water. The combustion gas produced in the catalytic combustor 41 is discharged to the exterior of the fuel cell system 100 through the first and second exhaust path 4A, 4B.

The first exhaust path 4A, with its one end connected to the catalytic combustor 41, is used to discharge the exhaust gas generated in the catalytic combustor 41 to the outside. The other end of the first exhaust path 4A communicates with outside air through the heat exchange reformer 24, superheater 23, and evaporator 22. These three units—heat exchange reformer 24, superheater 23, and evaporator 22—are heated through heat exchange with the combustion gas flowing through the first exhaust path 4A.

The second exhaust path 4B branches off from the first exhaust path 4A at a position downstream to the catalytic combustor 41, and is used, in a similar fashion with the first exhaust path 4A, to discharge the exhaust gas generated in the catalytic combustor 41 to the outside through the air heat exchanger 32. The air heat exchanger 32 is heated through heat exchange with the combustion gas flowing through the second exhaust path 4B.

The flow ratio of the combustion gas between the first and the second exhaust path (4A and 4B) can be adjusted, for example, by arranging a throttle valve (not shown in the figure) in either one of the paths (4A or 4B). Opening of the throttle valve can be controlled by the controller 7.

Note that, during a warming up period of the fuel cell system 100 (typically a starting-up period), raw fuel is injected into the catalytic combustor 41 through the injector 611. Catalytic combustion of the raw fuel injected into the catalytic combustor 41 warms up the catalytic combustor 41, and the combustion gas produced thereby warms up such units as the air heat exchanger 32, heat exchange reformer 24, superheater 23, and evaporator 32. While the fuel cell system 100 is being warmed up, air is supplied to the air heat exchanger 32 and the heat exchange reformer 24 (heat exchanger), and the air is heated by the combustion gas produced in the catalytic combustor 41. As mentioned earlier, the air heated in this way is provided to the fuel cell stacks 11, 12, and 13 to warm up (raise temperature of) these fuel cell stacks (11, 12, and 13).

The controller 7 is the device to integrally control the operation of the whole system. The controller 7 consists of general-purpose electric circuits that may include a microcomputer, microprocessor, CPU, etc., and peripheral circuits, and runs programs specifically designed to control the processes that takes place in the fuel cell system 100. For example, the steps taking place in the start-up period of the fuel cell system 100, described in the following paragraphs, are performed under the control of the controller 7.

Figure 2:
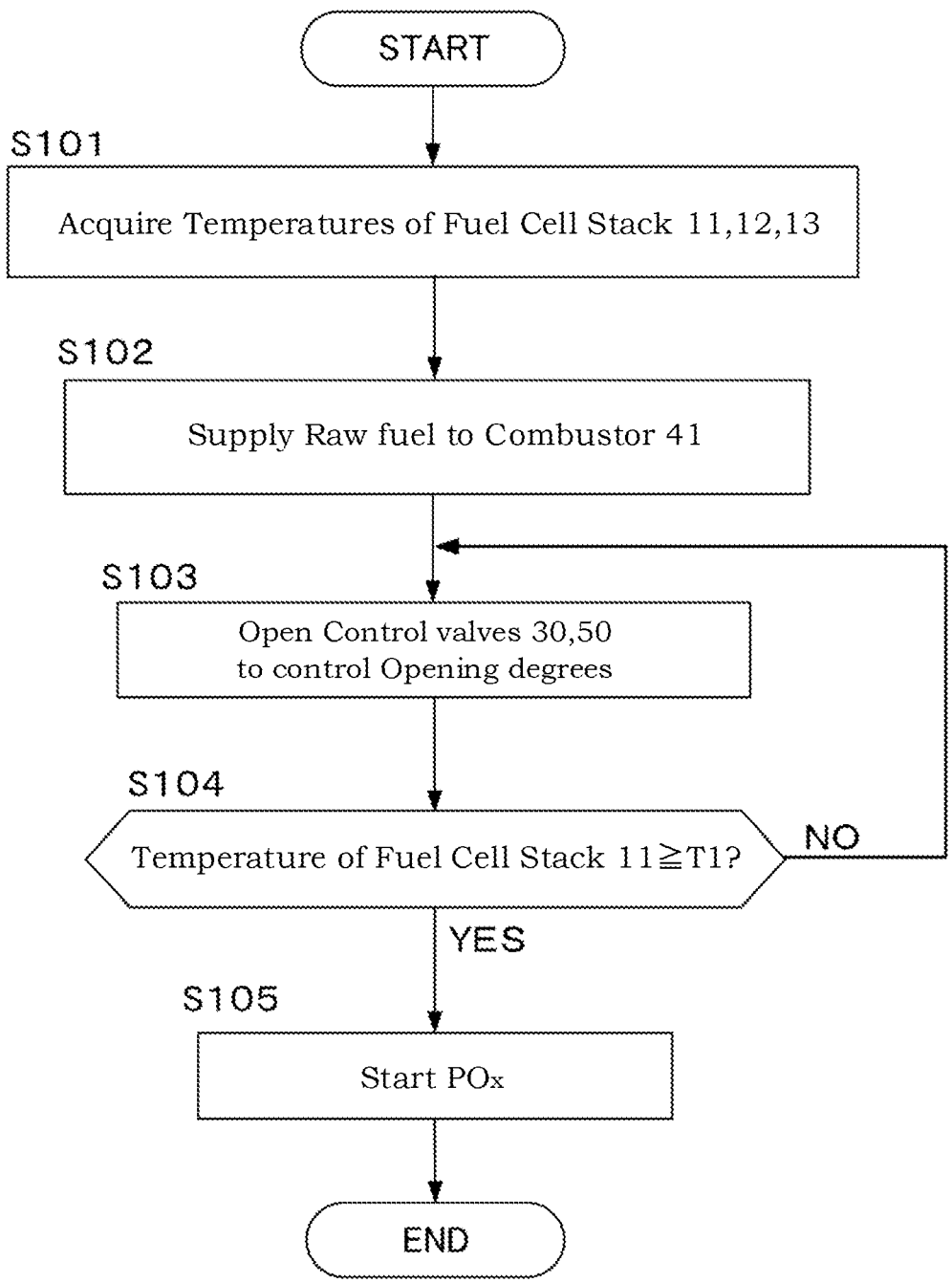
FIG. 2 is a flow chart illustrating the sequence to warm up the fuel cell stacks contained in the first embodiment of the fuel cell system during the start-up period

FIG. 2 is a flow chart illustrating the control sequences in the start-up period of the fuel cell system 100 of this embodiment. The following control operations are all performed by the controller 7.

Upon receiving a system startup command, the controller 7 starts controlling the fuel cell stacks to put the system in operation. The system startup command is sent to the controller 7 when, for example, the ignition key of a vehicle is turned from OFF to ON, or when a power generation request is issued to the fuel cell system 100.

When the control of the fuel cell stacks begins in the system start-up period, the controller 7 acquires the temperatures of the fuel cell stacks 11, 12, and 13 in step S101. The temperature sensors are arranged in the vicinity of the outlet port of each cathode electrode of the fuel cell stacks 11, 12, and 13, and the values detected by these temperature sensors are considered to represent the temperatures of the fuel cell stacks 11, 12, and 13.

In step S102, the injector 611 inject raw fuel, delivered from the fuel tank 21, into the catalytic combustor 41. The raw fuel injected into the catalytic combustor 41 is catalytically burned, producing a combustion gas. The combustion gas flows from the catalytic combustor 41 into the exhaust path 4.

Next, in step S103, the controller 7 opens the control valve 30 and the control valve 50. The opening degrees of these two valves (30, 50) enable the air drawn by the air blower 31 to flow into the air heat exchanger 32 and the heat exchange reformer 24. The air provided to these two units—the air heat exchanger 32 and the heat exchange reformer 24—is heated by the combustion gas generated in the catalytic combustor 41 and flowing through the exhaust path 4. The air heated by the air heat exchanger 32 is fed via the air supply path 3 to the fuel cell stacks 11, 12, and 13, and the air heated by the heat exchange reformer 24 is fed via the fuel supply path 2 to fuel cell stacks 11, 12, and 13. The heated air provided in this way warms up each of the fuel cell stacks 11, 12, and 13.

As the air supply path 3 is serially connected to the cathode side of fuel cell stacks from the fuel cell stack 11 to 12, and then to 13, warming up these fuel cell stacks only by means of heated air that flows through the air supply path 3 tends to give larger temperature elevation located more upstream side than others, resulting in large temperature variation among the fuel cell stacks. Power generation under such conditions—i.e., with large temperature variation among the fuel cell stacks—may result in fluctuated power output and deteriorated power generation efficiency. In this embodiment, in addition to the heated air supply through the air supply path 3 to the cathode side of the fuel cell stacks 11, 12, and 13, heated air is also supplied through the fuel supply path 2 connected parallelly to each anode side of the fuel cell stacks 11, 12, and 13. This configuration has an effect of reducing temperature variations among the three fuel cell stacks 11, 12, and 13.

In step S103, the opening degrees of the control valve 30 and the control valve 50 are adjusted based on the temperatures of the fuel cell stacks 11, 12, and 13. For example, when temperature variation among the fuel cell stacks 11, 12, and 13 are large, the control valve 50 is controlled to open more widely to increase the air flow through the fuel supply path 2 to the fuel cell stacks 11, 12, and 13. Because the fuel supply path 2 is connected parallelly to the fuel cell stacks 11, 12, and 13, increased flow through the fuel supply path 2 can exert an effect of reducing temperature variations among the fuel cell stacks 11, 12, and 13. On the other hand, if air remains in the fuel supply path 2 after the fuel cell stacks 11, 12, and 13 have been warmed up, the air can promote oxidation of the anode electrodes of these stacks. To avoid undesirable oxidation of the anode electrodes, hot air should preferably be supplied through the air supply path 3 during the warming up period of the fuel cell stacks 11, 12, and 13. For this reason, the control valve 30 is controlled to open wider when temperature variation among the fuel cell stacks 11, 12, and 13 is small, thus increasing the air supply through the air supply path 3.

In step S104, the controller 7 checks if the temperature of the fuel cell stack 11 (positioned on the most upstream side of the air supply path 3) is equal or above a prescribed temperature T1. This prescribed temperature T1 is set to the level slightly lower than the stack oxidation prevention temperature T0 (the lowest temperature at which anode electrode oxidation occurs), and, at the same time, suitable for the initiation of partial oxidation reforming reaction (POx). If the temperature of the fuel cell stack 11 obtained in step S104 is equal or greater than the prescribed temperature T1, the controller 7 performs the procedures assigned to step S105.

In step S105, the controller 7 starts partial oxidation reforming reaction (POx) in the heat exchange reformer 24. More particularly, the controller 7 operates the injector 221 to provide fuel from the fuel tank 21 to the heat exchange reformer 24, and adjusts the opening of the control valve 50 to provide a proper amount of air required to maintain POx to the heat exchange reformer 24 via the connection path 5. When POx starts, the controller 7 terminates warming up procedures of the fuel cell stacks that have been performed during the start-up period of the fuel cell system 100.

If the temperature of the fuel cell stack 11 obtained in step S104 is lower than the prescribed temperature T1, processing of the controller 7 returns to step S103 and adjust the opening degrees of the control valves 30 and 50 based on the temperatures of the fuel cell stacks 11, 12, and 13.

The first embodiment of the fuel cell system 100 described above provides the following benefits.

The fuel cell system 100 is equipped with the connection path 5 connecting a position on the air supply path 3 upstream of the air heat exchanger 32 to a position on the fuel supply path 2 upstream fo the heat exchange reformer 24 (heat exchanger). A control valve 30 (first control valve) is arranged in the air supply path 3 to adjust air flow into the air heat exchanger 32, and a control valve 50 (second control valve) is arranged in the connection path 5 to adjust air flow into the heat exchange reformer 24 (heat exchanger). At the time of starting the fuel cell system 100, heated air is provided to the fuel cell stacks 11, 12, and 13 (fuel cell) using both the air supply path 3 and fuel supply path 2. To attain proper flow rate, the opening degrees of the control valve 30 (the first control valve) and the control valve 50 (the second control valve) is adjusted. In this way, during the start-up period of the system, heated air is provided to the fuel cell stacks 11, 12, and 13 not only by the serially connected air supply path 3, but also by the parallelly connected fuel supply path 2, thus suppressing temperature variation to occur among the fuel cell stacks 11, 12, and 13. Suppression of temperature variation among the fuel cell stacks 11, 12, and 13 has an effect of reducing fluctuation of power output as well as improving power generation efficiency.

At the time of starting the fuel cell system 100, the opening degrees of the control valve 30 (the first control valve) and the control valve 50 (the second control valve) is adjusted based on the temperatures of each fuel cell stacks 11, 12, and 13 (fuel cell) to control the flow rate of heated air flowing into the fuel cell stacks 11, 12, and 13 (fuel cell). In this way, air is provided to each of the fuel cell stacks 11, 12 using two paths (the air supply path 3 and fuel supply path 2), and the flow rate is adjusted based on the temperatures of each of fuel cell stacks 11, 12, and 13 to reduce temperature differences among the fuel cell stacks 11, 12, and 13. The approach described above is effective to suppress fluctuation of power output, and to improve efficiency of power generation. As the air flow from the two paths (the air supply path 3 and fuel supply path 2) to the fuel cell stacks 11, 12, and 13 is adjusted based on the temperatures of each fuel cell stacks 11, 12, and 13, the flow through the fuel supply path 2 is limited to the level required to suppress the temperature variation. Namely, excessive air flow through the fuel supply path 2 is avoided. In addition, oxidation of the anode electrodes of the fuel cell stacks 11, 12, and 13 due to redundant air remaining in the fuel supply path 2 is effectively prevented.

Although the system in this embodiment has the configuration in which a plurality of fuel cell stacks is arranged, fuel cell systems need no be of multi stack configuration but may be constructed in such an arrangement in which a plurality of cell groups are configured adjacently to each other. In such a configuration, the fuel supply path 2 is connected parallelly to each of the cell groups, and the air supply path 3 is connected serially through the cell groups.

In this embodiment, the exhaust path 4 consists of two paths—i.e., the first exhaust path 4A and the second exhaust path 4B. But the path configuration is not limited to this: for example, a single exhaust path 4 that runs through the air heat exchanger 32, heat exchange reformer 24, superheater 23, and evaporator 22 may be used.

In this embodiment, the temperatures of the fuel cell stacks 11, 12, and 13 are measured by the temperature sensors located in the vicinity of the outlet of each cathode electrode, and the values obtained are considered to represent the stack temperatures. But the method to obtain the temperatures of fuel cell stacks 11, 12, and 13 is not limited to this. For example, the temperature sensors may be installed in the vicinity of outlet of each anode electrode, and the values obtained from these temperature sensors may be considered to represent the stack temperature of the fuel cell. Another alternative is to install two temperature sensors—one in the vicinity of the outlet of cathode electrode side, and the other of anode electrode side—and consider the average of the two measured values to represent the fuel cell stack temperature.

Although the opening degrees of the control valve 30 and 50 are adjusted preferably based on the temperatures of the fuel cell stacks 11, 12, and 13, the method of opening adjustment is not limited to this. In a system configuration where the fuel supply path 2 is parallelly connected to the fuel cell stacks 11, 12, and 13, and is also used for the purpose of supplying heated air to the stacks, temperature variation among the fuel cell stacks 11, 12, and 13 can be suppressed to a higher degree than a system that only employs the air supply path 3 connecting the stacks serially.

Second Embodiment

In the following paragraphs, the second embodiment of the fuel cell system 100 is described referring to FIG. 3 to FIG. 5. Note that the symbols and notations used in the first embodiment are also employed for the corresponding elements in the second embodiment, and descriptions for them are omitted.

The difference with the first embodiment is the provision of a detour (bypass 8) that branches off from the connection path 5 and connects to a segment of the air supply path 3 in upstream side of the fuel cell stacks 11, 12, and 13, thus bypassing the air heat exchanger 32.

Figure 3:
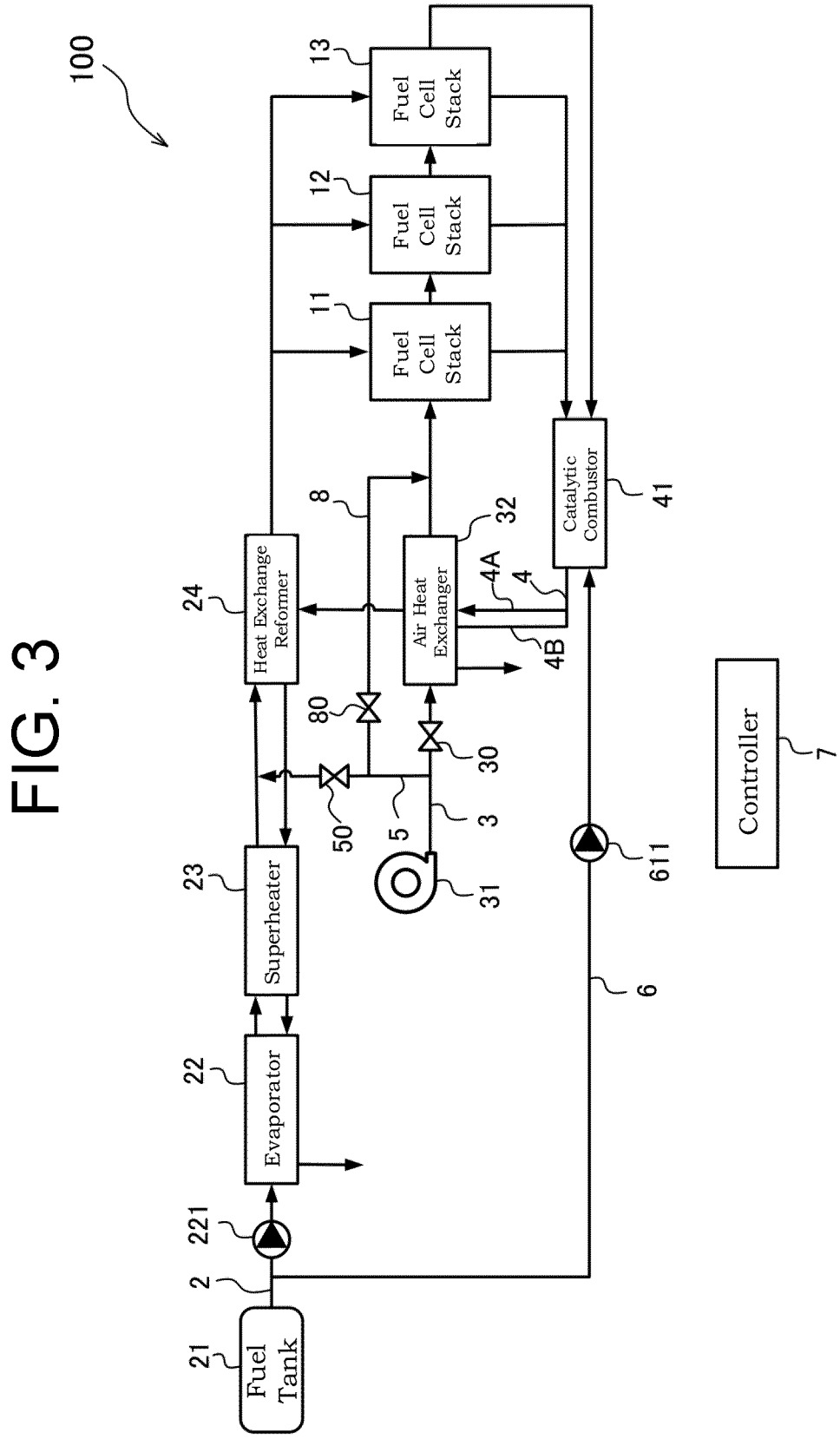
FIG. 3 shows a schematic construction of the fuel cell system that represents the second embodiment of the invention.

FIG. 3 is a schematic drawing showing the major configuration of the second embodiment of the fuel cell system 100.

As shown in FIG. 3, the bypass 8 branches off from the connection path 5 at a position upstream to the control valve 50.

The bypass 8 branches off from the connection path 5 at the position upstream to the control valve 50, and connects to a position of the air supply path 3 between the air heat exchanger 32 and the fuel cell stack 11. The bypass 8 provides the air, taken into the air supply path 3 by the air blower 31, to the fuel cell stack 11 bypassing the air heat exchanger 32. In other words, the bypass 8 provides unheated external air to the fuel cell stack 11, which is positions on the most upstream side on the air supply path 3 among the three fuel cell stacks 11, 12, and 13.

A control valve 80 (the third control valve) is provided in the bypass 8 to control the flow therethrough by adjusting the opening of the control valve 80. Opening of the control valve 80 can be controlled by the controller 7. When the control valve 80 is opened, two streams of air—one stream flowing through the bypass 8, and another heated while flowing through the air heat exchanger 32—are mixed at a position in the air supply path 3 between the air heat exchanger 32 and the fuel cell stack 11. The heated air from the air heat exchanger 32 is cooled when mixed with the air from the bypass 8 that has bypassed heating in the air heat exchanger 32. Therefore, if the control valve 80 is opened during the warming up period of the fuel cell system 100, heat exchange takes place in the fuel cell stack 11 between the mixed air flowing thereinto via the air supply path 3 and the heated air flowing thereinto via the fuel supply path 2. This heat exchange has an effect of suppressing temperature rise in the fuel cell stack 11. The wider the opening of the control valve 80, the greater the flow rate of air through the bypass 8, contributing more effectively to lower the temperature of mixed air. Therefore, the temperature of the fuel cell stack 11 can be controlled by adjusting the opening of the control valve 80.

In a fuel cell system having a plurality of fuel cell stacks, if warming up of the system during a start-up period is performed by providing heated air through an air supply path serially connected to the fuel cell stacks, as described earlier, the temperatures of the stacks become higher in upstream side than in downstream side. Waiting for the temperatures of the downstream fuel cell stacks to rise to the desired level allows the temperatures of upstream fuel cell stacks to rise to a level higher than the stack oxidation prevention temperature T0 (the lowest temperature at which anode electrode oxidation occurs) inducing anode electrode oxidation of the fuel cell stacks. In this embodiment, excessive temperature rise in the fuel cell stack 11 can be avoided by controlling the degree of opening of the control valve 80. Therefore, the temperature of the fuel cell stack 11 can be prevented from rising above the stack oxidation prevention temperature T0 during the period while the system is waiting for completion of warming up of the fuel cell stacks 12, 13.

Controllability of the temperature of the fuel cell stack 11 through opening adjustment of the control valve 80 enables the system to maintain the temperature to be maintained at an level suitable for the initiation of POx during the period while waiting for the completion of warming up of the fuel cell stacks 12, 13.

In this embodiment, the control valve 80 is arranged in a path branched off from the bypass 8, but the configuration is not limited to this: the path to which the control valve 80 is arranged may branch off from any position on the air supply path 3 upstream to the control valve 30, and connect to any position on the air supply path 3 between the air heat exchanger 32 and the fuel cell stack 11.

Figure 4:
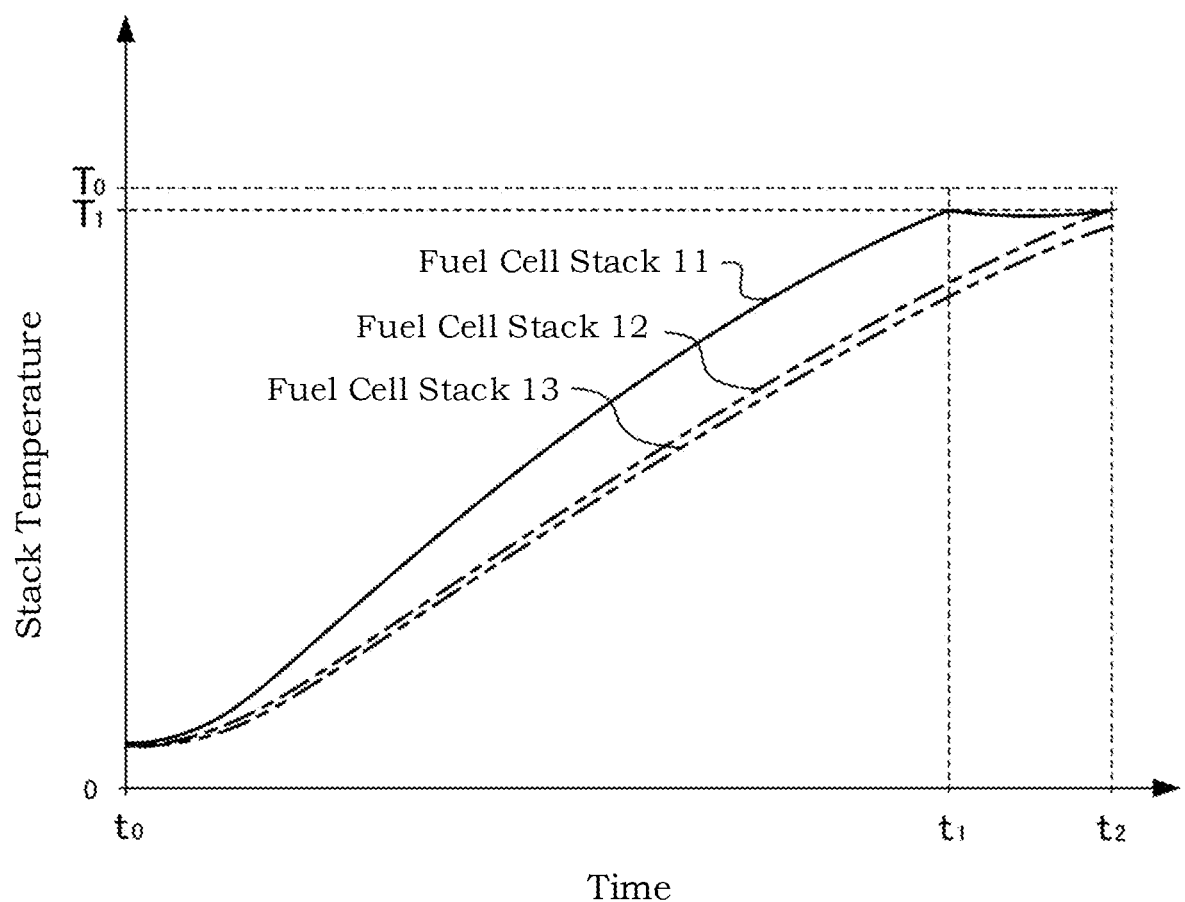
FIG. 4 is a time chart illustrating the sequence to warm up the fuel cell stacks contained in the second embodiment of the fuel cell system during the start-up period

FIG. 4 shows a time chart illustrating the sequence to control the fuel cell stacks in the second embodiment of the fuel cell system 100 during the start-up period.

When the fuel cell system 100 is activated at t0, warming up procedures of the fuel cell stacks 11, 12, and 13 start. Similarly with the first embodiment, the fuel cell stacks 11, 12, and 13 are warmed up by the heated air provided through the air supply path 3 and the fuel supply path 2.

When the temperature of the fuel cell system 11 reaches the prescribed temperature T1 at a time position t1, the control valve 80 arranged in the bypass 8 is opened to suppress further temperature rise of the fuel cell stack 11. Similarly with the first embodiment, this prescribed temperature T1 is set to the level slightly lower than the stack oxidation prevention temperature T0 and yet suitable for the initiation of POx.

In contrast to the first embodiment where the opening degrees of the control valves 30 and 50 are adjusted to suppress temperature variation among the fuel cell stacks 11, 12, and 13, the opening degrees of the control valves 30 and 50 in this embodiment are controlled, up until the time t1, in a way so as to increase temperature elevation speed of the fuel cell stack 11. This enables the fuel cell stack 11 to reach the prescribed temperature T1 in a shorter period of time.

When the fuel cell stack 12 reaches the prescribe temperature at the time t2, POx is allowed to initiate. During the time period from t1 to t2, the opening of the control valve 80 is controlled to maintain the temperature of the fuel cell stack 11 at around the same level. After the control valve 80 has been opened, the air provided via the air supply path 3 to the fuel cell stacks 11, 12, and 13 has a lower temperature than the air provided through the fuel supply path 2. Thus, the air provided by the air supply path 3 has a smaller contribution to temperature rise of the fuel cell stacks 11, 12, and 13 than the air provided by the fuel supply path 2. Therefore, the fuel cell stacks 12 and 13 are heated mainly by the air provided from the fuel supply path 2, resulting in restriction of temperature variation between the fuel cell stacks 12 and 13. As the results, at the time t2 when the fuel cell stack 12 reaches the prescribed temperature T1, the fuel cell stack 12 also has a temperature very near to T1.

Figure 5:
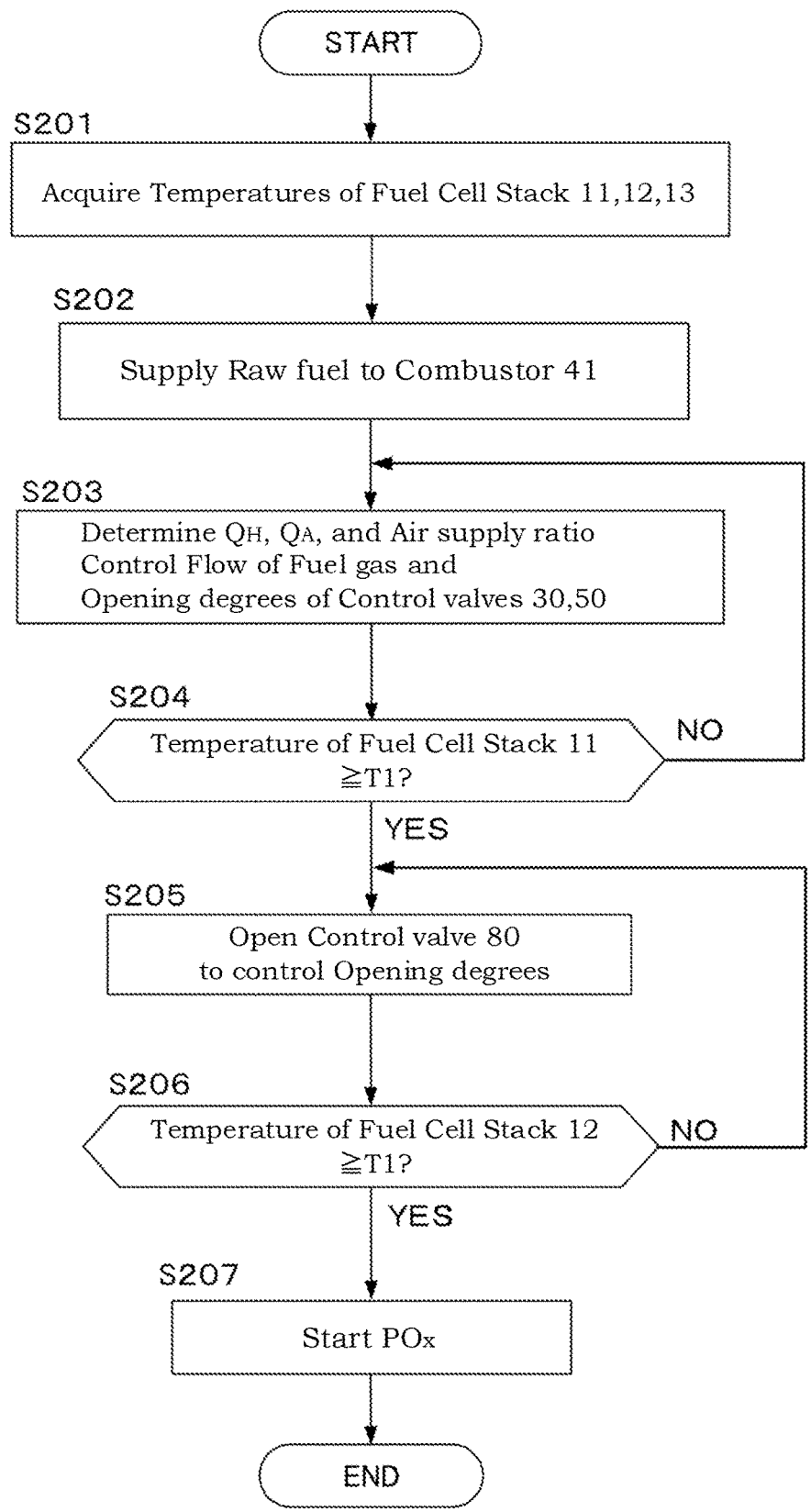
FIG. 5 is a flow chart illustrating the sequence to warm up the fuel cell stacks contained in the second embodiment of the fuel cell system during the start-up period

FIG. 5 is a flow chart illustrating the control sequence of the fuel cell stacks in the second embodiment of the fuel cell system 100 during the start-up period. The following control operations are all performed by the controller 7.

Upon receiving a system startup command, the controller 7 starts controlling the fuel cell stacks to put the system in operation.

When the control of the fuel cell stacks begins in the system start-up period, the controller 7 acquires the temperatures of the fuel cell stacks 11, 12, and 13 in step S201. Similarly with the first embodiment, the temperature sensors are arranged in the vicinity of the outlet port of each cathode electrode of the fuel cell stacks 11, 12, and 13, and the values detected by these temperature sensors are considered to represent the temperatures of the fuel cell stacks 11, 12, and 13.

In step S202, the controller 7 activates the injector 611 to inject raw fuel, delivered from the fuel tank 21, into the catalytic combustor 41. The raw fuel injected into the catalytic combustor 41 is catalytically burned, producing a combustion gas.

Next, in step S203, the controller 7 determines the quantity of heat input $Q_H$ to the heat exchange reformer (heat exchanger) 24, heat input $Q_A$ to the air heat exchanger 32, and the air supply ratio between these two units. Further, the controller 7 adjusts the flow rate of combustion gas flowing through the first and second exhaust paths 4A and 4B so that the heat inputs determined above are satisfied, and controls the control valves 30 and 50 so that the air supply ratio determined above is satisfied.

These parameters—heat input $Q_H$ to the heat exchange reformer 24, heat input $Q_A$ to the air heat exchanger 32, and air supply ratio—are determined so as to increase the heat elevation speed of the fuel cell stack 11. More particularly, these parameters—heat input $Q_H$, heat input $Q_A$, and air supply ratio—are determined based on the following equations: the equation (1) is used in case $Q_H \geq Q_A$, and equation (2) is used in case $Q_H < Q_A$. Where, $M_{air}$ in equation (1) and (2) represents the total amount of atmospheric air taken into the air supply path 3, $m_{air,A}$ represents the quantity of air supplied to the air heat exchanger 32, and n is the number of fuel cell stacks. In this embodiment, n takes the value of 3.

[Eq. 1]

$$m_{air,A}/M_{air} \geq \frac{n}{\frac{Q_H}{Q_H + Q_A}} \quad (1)$$

[Eq. 2]

$$m_{air,A}/M_{air} \geq \frac{Q_A}{Q_H + Q_A} \quad (2)$$

The left-hand member of equations (1) and (2) (i.e., $m_{air,A}/M_{air}$) represents the ratio of air supply to the air heat exchanger 32, and the fastest temperature elevation of the fuel cell stack 11 is obtained if the left and right-hand member of the equation becomes equal. As described earlier, to avoid undesirable oxidation of the anode electrodes due to the air remaining after warm up, heated air should preferably be supplied through the air supply path 3 during the warming up period of the fuel cell stacks 11, 12, and 13. Therefore, in this embodiment, the ratio of air supply ($m_{air,A}/M_{air}$) to the air heat exchanger 32 is generally set in a way that the left-hand member is greater than the right-hand member, i.e., greater than the ratio at which the highest temperature elevation is obtained. However, equating both sides of the equations (1) and (2) is a more preferable option, at which condition the ratio of air supply ($m_{air,A}/M_{air}$) to the air heat exchanger 32 provides the fastest temperature elevation to the fuel cell stack 11. This enables to raise the temperature of the fuel cell stack 11 in a shortest possible time. In addition to the shortened warm up time of the fuel cell stack 11, the overall warm up time of the fuel cell stacks 11, 12, and 13 also becomes shorter in comparison with an approach where the temperature variation among the fuel cell stacks 11, 12, and 13 are suppressed during the warming up.

As the controller 7 starts controlling the flow rate of the combustion gas and the opening degrees of the control valves 30 and 50 based on the determined parameters (heat input $Q_H$, $Q_A$, and the ratio of air supply), air is provided to the air heat exchanger 32 and the heat exchange reformer 24 and heated by the combustion gas. The heated air is provided to each of the fuel cell stacks 11, 12, and 13 through the air supply path 3 and the fuel supply path 2, initiating warming up of each fuel cell stacks 11, 12, and 13.

As described above, the heat input $Q_H$ to the heat exchange reformer 24, the heat input $Q_A$ to the air heat exchanger 32, and the ratio of air supply are preferable determined using the equations (1) and (2). However this is not the only option: for example, they may be determined based on the temperatures of the fuel cell stacks 11, 12, and 13.

In step S204, the controller 7 determines if the temperature of the fuel cell stack 11 (arranged at the most upstream side of the air supply path 3) has reached a level equal to, or greater than the prescribed temperature T1. If the temperature of the fuel cell stack 11 is found to be below the prescribed temperature T1, the controller 7 returns to the processing in step S203 and controls the flow of fuel gas and the opening degrees of the control valves 30 and 50. If the temperature of the fuel cell stack 11 is found to be equal to, or greater than the prescribed temperature T1, the controller 7 performs the operations assigned to step S205.

In step S205, the controller 7 opens the control valve 80. By opening the control valve 80, air starts to flow through the bypass 8 and produces mixed air at the junction with the air flowing in the air supply path 3. The mixed air thus produced has a temperature lower than that of the fuel cell stack 11. Supply of lower temperature air to the fuel cell stack 11 has an effect of suppressing temperature rise in the fuel cell stack 11. The controller 7 controls the degree of opening of the control valve 80 in such a way that heat dissipated from the fuel cell stack 11 to the mixed air provided by the air supply path 3 becomes equal to, or greater than heat amount provided to the fuel cell stack 11 by the air flowing though the fuel supply path 2. For example, if the air provided from the fuel supply path 2 to the fuel cell stack 11 has a larger heat amount than the amount of heat dissipated to the mixed air provided from the air supply path 3 to the fuel cell stack 11, the net effect obtained is the temperature elevation of the fuel cell stack 11. In such a case, the controller 7 opens the control valve 80 wider to lower the temperature of mixed air, thus making heat of dissipation from the fuel cell stack 11 to become greater than the heat amount provided to the fuel cell stack 11. By this, temperature elevation of the fuel cell stack 11 is suppressed.

The controller 7 controls the control valves 30, 50, and 80 in such a way that the ratio of two air quantities—total air volume ($M_{air}$) taken into the air supply path 3 and the provision of air to the heat exchange reformer—is kept equal before and after the control valve 80 is opened. Namely, the control valves 30, 50, and 80 are controlled to hold the equation (3) below. In equation (3), $m_{air,B}$ represents the air quantity provided to the bypass 8, and $m_{air,H}$ represents the air quantity provided to the heat exchange reformer 24.

[Eq. 3]

$$m_{air,H}/M_{air,A} = \frac{m_{air,H}}{m_{air,A} + m_{air,B}} \quad (3)$$

As the ratio of air supply to the heat exchange reformer 24 is kept the same before and after the control valve 80 is opened, the temperature of the fuel cell stack 11 can be adjusted by controlling the ratio of two air supplies: to the air heat exchanger 32, and to the bypass 8. This makes temperature adjustment of the fuel cell stack 11 easier.

Although the method described above is preferred (i.e., the air supply ratio to the heat exchanger reformer 24 before and after the opening of the control valve 80 is kept constant), other methods may also be employed. Even if the ratio of air supply to the heat exchanger reformer 24 changes before and after the opening of the control valve 80, the temperature of the fuel cell stack 11 can be controlled so as not to rise above the stack oxidation prevention temperature T0.

In step S206, the controller 7 determines if the fuel cell stack 12 has reached the prescribed temperature T1. If the temperature of the fuel cell stack 12 has not yet reached the prescribed temperature T1, the controller 7 returns to step S205 and controls the opening of the control valve 80.

If the fuel cell stack 12 is found to have reached the prescribed temperature T1, the controller 7 performs processing assigned to step S207.

In step S207, the controller 7 starts partial oxidation reforming reaction (POx) in the heat exchange reformer 24. As described earlier, if the fuel cell stack has reached the prescribed temperature T1, the fuel cell stack 13 also has reached the range near the prescribed temperature T1. With the start of POx, the controller terminates warming up procedures in the start-up period of the fuel cell system 100.

The second embodiment of the fuel cell system 100 described above can further provide the following effects.

In this embodiment of the fuel cell system 100, an air flow path (bypass 8) that bypasses the air heat exchanger 32 and directly connects to the upstream of the fuel cell stack 11 (fuel cell) is arranged. The bypass 8 branches off from the connection path 5, or from upstream portion of the air supply path 3. A control valve 80 (the third control valve) is arranged in the bypass 8 enabling controlled air supply to the fuel cell stack 11 (fuel cell) without passing through the air heat exchanger 32, and is activated normally while the fuel cell system 100 is in the start-up period. When the control valve 80 is opened, heated air flow from the air heat exchanger 32 is mixed with the unheated air flow from the bypass 8 at a position upstream to the fuel cell stack 11 (fuel cell), resulting in lowering of air flow temperature. Therefore, when the control valve 80 is opened during a warm-up period of the fuel cell system 100, heat exchange takes place in the fuel cell stack 11 between the mixed air from the air supply path 3 and the air from the fuel supply path 2. This heat exchange has an effect of suppressing temperature rise of the fuel cell stack 11. Therefore, this prevents the most upstream fuel cell stack 11 from excessive temperature elevation (typically over the stack oxidation prevention temperature T0) while waiting for the downstream fuel cell stacks 12 and 13 to complete warm up. Thus, anode electrode oxidation of the fuel cell stack 11 (located most upstream) is prevented.

The wider the opening of the control valve 80, the greater the flow rate of air through the bypass 8 and the lower the temperature of mixed air. Therefore, the temperature of the fuel cell stack 11 can be controlled by adjusting the opening of the control valve 80. As the temperature of the fuel cell stack 11—positioned on most upstream side—can be controlled by adjusting the opening of the control valve 80, the temperature of the fuel cell stack 11 can be maintained to the level equal to, or below the stack oxidation prevention temperature T0 during the period while the system is waiting for the downstream fuel cell stacks 12 and 13 to complete warming up. In this way, during the period while the system is waiting for the downstream fuel cell stacks 12 and 13 to complete warming up, the temperature of the fuel cell stack 11 on the most upstream side can be maintained at around the level suitable to start POx, simultaneously preventing the temperature to rise above the stack oxidation prevention temperature T0. Therefore, POx can be initiated immediately after the warm-up of the downstream fuel cell stacks 12 and 13 has completed. The warming up time required for the fuel cell stacks 11, 12, and 13 as a whole can thus be reduced.

From the time this embodiment of the fuel cell system 100 is activated until the fuel cell stack 11—the first fuel cell: positioned most near to the air heat exchanger 32 than other fuel cell stacks 12 and 13—is warmed up to the prescribed temperature T1, the system controls the opening degrees of control valve 30 (the first control valve) and the control valve 50 (the second control valve) so as to provide the fuel cell stack 11 with the highest warming up rate. When the fuel cell stack 11 (the first fuel cell) has reached the prescribed temperature, the system starts to control the opening of the control valve 80 (the third control valve) in a way so as to satisfy the following condition: heat amount dissipated from the fuel cell stack 11 (the first fuel cell) to the air provided through the air supply path 3 is equal to, or greater than the heat amount given to the fuel cell stack 11 (the first fuel cell) from the air provided through the fuel supply path 2. As described above, up until the time when the fuel cell stack 11 (the first fuel cell) reaches the prescribed temperature, the system puts priority to give the fastest heat-up speed to the fuel cell stack 11 (the first fuel cell), and controls the control valve 30 (the first control valve) and the control valve 50 (the second control valve) accordingly. Therefore, in comparison with the method in which the fuel cell stacks 11, 12, and 13 are warmed up in a way so that temperature variation among them becomes minimum, the method described above enables shortening of the warming up time of the fuel cell stack 11, as well as that of the fuel cell stacks 11, 12, and 13 as a whole.

After the fuel cell stack 11 (the first fuel cell) has reached the prescribed temperature, the opening of the control valve 80 (the third control valve) is controlled so as to maintain heat dissipation from the fuel cell stack 11 (the first fuel cell) is equal to, or greater than the heat amount given to the fuel cell stack 11. This ensures that the temperature of the fuel cell stack 11—positioned on the most upstream side—is not raised above the stack oxidation prevention temperature T0.

From the time this embodiment of the fuel cell system 100 is activated until the time the fuel cell stack 11 (first fuel cell)—positioned most near to the air heat exchanger 32 among the fuel cell stacks 11, 12, and 13—reaches the prescribed temperature, the degree of opening of the control valve 30 (first control valve) and the control valve 50 (second control valve) is controlled in the way described below. When the heat input $Q_H$ to the heat exchange reformer 24 (heat exchanger) is greater than the heat input $Q_A$ to the air heat exchanger 32, the control valve 30 (first control valve) and the control valve 50 (second control valve) are controlled in such a way so as to maintain the air supply ratio $m_{air\_A}/M_{air}$ is equal to, or greater than the ratio $n/(Q_H/(Q_H+Q_A))$: where, $m_{air\_A}$ is the air supply to the air heat exchanger 32, $M_{air}$ is the total air supply to the heat exchange reformer 24 and the air heat exchanger 32, n is the number of fuel cell stacks (fuel cells), $Q_H$ is the heat input to the heat exchange reformer 24, and $Q_A$ is the heat input to the air heat exchanger 32. On the other hand, if the heat input $Q_H$ to the heat exchange reformer 24 (heat exchanger) is smaller than the heat input $Q_A$ to the air heat exchanger 32, the control valve 30 (first control valve) and the control valve 50 (second control valve) are controlled in such a way so as to maintain the air supply ratio $m_{air\_A}/M_{air}$ is greater than the ratio $Q_H/(Q_H+Q_A)$. In other words, up until the time when the fuel cell stack 11 (first fuel cell) reaches the prescribed temperature, degree of opening of the control valve 30 (first control valve) and the control valve 50 (second control valve) is controlled in such a way as to maintain the air supply ratio ($m_{air\_A}/M_{air}$) to the level equal to, or greater than the value at which the fuel cell stack 11 is warmed up most rapidly. In this way, the contribution of the air from the air supply path 3 in the totality of the air provided to the fuel cell stacks 11, 12, and 13 is controlled to the level at which the fuel cell stack 11 (the first fuel cell) can be warmed up most rapidly, or to the level greater than this. This method enables to curb the fraction of air form the fuel supply path 2, minimizing the possibility of anode electrode oxidization due to residual air inside the fuel supply path 2.

In this embodiment of the fuel cell system 100, the degree of openings of the three control valves—control valve 30 (the first control valve), control valve 50 (the second control valve), and the control valve 80 (the third control valve)—are controlled in such a way as to keep the same value for the ratio $m_{air\_H}/M_{air}$ before and after the control valve 80 is opened, wherein $m_{air\_H}$ represents the air supply to the heat exchange reformer 24 (heat exchanger), and $M_{air}$ represents the total air supply including the air supply to the heat exchange reformer 24 (heat exchanger), to the air heat exchanger 32, and (while the control valve 80 is opened) to the bypass 8 as well. In other words, the control valves 30, 50, and 80 (the first to third control valves) are controlled to maintain the ratio $m_{air\_H}/M_{air}$ (i.e., the air supply to the heat exchange reformer 24 against the total air taken into the air supply path 3) constant irrespective of opening/closure of the control valve 80. As the ratio $M_{air}H/M_{air}$ is kept constant before and after the control valve 80 (the third control valve) is opened, the temperature of the fuel cell stack 11 can be adjusted solely by controlling the ratio between the air supply to the air heat exchanger 32 and the air supply to the bypass 8. This makes temperature adjustment of the fuel cell stack 11 easier.

Variations of the Second Embodiment

In the following paragraphs, a variation of the second embodiment of the fuel cell system 100 is described referring to FIG. 6. Note that the symbols and notations used in the first and second embodiments are also employed for the corresponding elements, and descriptions for them are omitted.

This embodiment is different from others in the position that air is provided, until the temperature of the fuel cell stack 11 reaches the prescribed value, to the heat exchange reformer 24 (heat exchanger) and air heat exchanger 32 keeping a specific air supply ratio that minimizes pressure loss.

Figure 6:
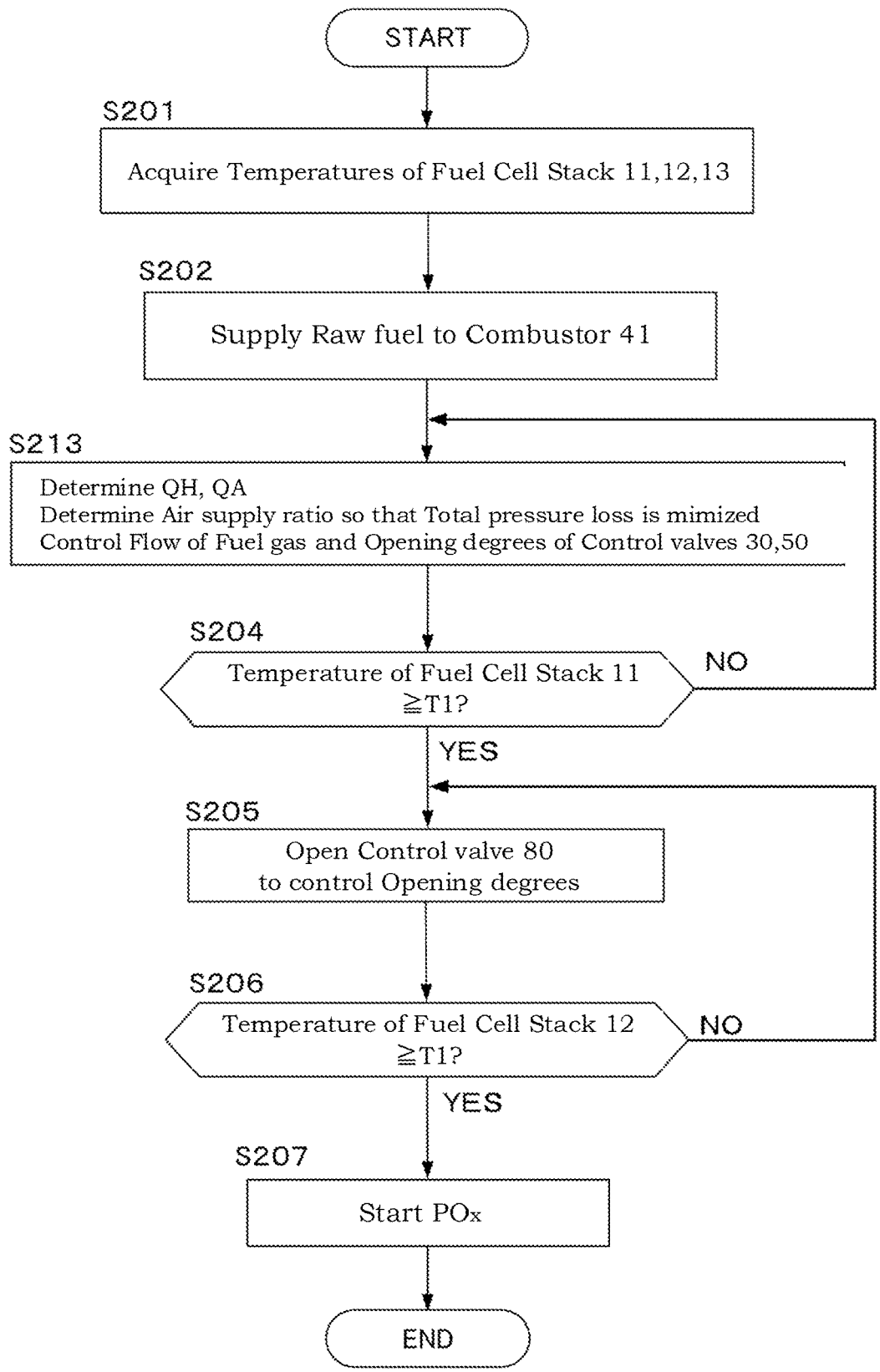
FIG. 6 is a flow chart illustrating the sequence to warm up the fuel cell stacks contained in a variant of the second embodiment of the fuel cell system during the start-up period.

FIG. 6 shows a flow chart illustrating the sequence to control the fuel cell stacks contained in the variant of the second embodiment of the fuel cell system 100 during the start-up period. The following control operations are all performed by the controller 7.

As the processings executed in step S201 and S202 are the same with those of the second embodiment, their descriptions are not reiterated here.

In step S213, the controller 7 determines the heat input $Q_H$ to the heat exchange reformer 24 (heat exchanger), the heat input $Q_A$ to the air heat exchanger 32, and the quantity ratio of air supply to these two units. Further, the controller 7 adjusts the flow rate of combustion gas flowing through the first and second exhaust paths 4A and 4B so that the heat inputs determined above are satisfied, and controls the control valves 30 and 50 so that the quantity ratio of air supply determined above is met.

These parameters—heat input $Q_H$ to the heat exchange reformer 24, heat input $Q_A$ to the air heat exchanger 32, and air supply ratio—are determined on one hand to satisfy the equation (1) and (2), and also to minimize the total pressure loss of the fuel supply path 2 and the air supply path 3 (total pressure loss). Air pressure loss $\Delta P_{an}$ through the fuel supply path 2, air pressure loss $\Delta P_{ca}$ through the air supply path 3, and total air pressure loss $\Delta P_{total}$ can be calculated using the equation (4) below. Where, $\Delta p_{an}$ is the air pressure loss associated with each path connecting parallelly from the fuel supply path 2 to each of the fuel cell stacks, $\Delta p_{ca}$ is the air pressure loss per one fuel cell stack connected serially from the air supply path 3, $A_{an}^2$ is the cross-sectional are of the fuel supply path 2, $A_{ca}^2$ is the cross-sectional area of the air supply path 3, man is the volume of air supply to the fuel supply path 2, and $m_{ca}$ is the volume of air supply to the air supply path 3.

[Eq. 4]

$$\Delta P_{an} = n \cdot \Delta p_{an} = n \cdot \frac{A_{ca}^2}{A_{an}^2} \frac{m_{an}^2}{m_{ca}^2} \cdot \Delta p_{ca} \quad (4)$$

$$\Delta P_{ca} = n \cdot \Delta p_{ca}$$

$$\Delta P_{total} = \Delta p_{an} + \Delta p_{ca}$$

In equation (4), $A_{an}^2$ (cross-sectional area of the fuel supply path 2) and $A_{ca}^2$ (cross-sectional area of the air supply path 3) are known values. Using equation (4), for each n, the ratio of the air supply to the fuel supply path 2 to the air supply to the air supply path 3 ($m_{an}$:$m_{ca}$) can be determined in such a way as to minimize the total pressure loss $\Delta P_{total}$. If we assume the two cross-sectional areas $A_{an}^2$ and $A_{ca}^2$ are equal, as the number of fuel cell stacks n is 3 in this embodiment, the total pressure loss $\Delta P$ total takes the minimum value when $m_{an}$:$m_{ca}$=5:5.

As the controller 7 starts to control the control valves 30 and 50 using the determined parameters (heat input $Q_H$, $Q_A$, and the air supply ratio), air is supplied to the air heat exchanger 32 and the heat exchange reformer 24 and heated by combustion gas. The heated air is supplied to the fuel cell stacks 11, 12, and 13 through the air supply path 3 and the fuel supply path 2, initiating warming-up of these fuel cell stacks.

As the processings executed in step S204 to S207 are the same with those of the second embodiment, their descriptions are not reiterated here.

The variant of the second embodiment of the fuel cell system 100 described above can further provide the following effect.

From the time this embodiment of the fuel cell system 100 is activated until the time when the fuel cell stack 11 (the first fuel cell) reaches the prescribed temperature T1, the opening degrees of the control valve 30 (the first control valve) and the control valve 50 (the second control valve) are controlled in a way so as to minimize total pressure loss ΔP total, which is the sum of air pressure loss $\Delta p_{an}$ due to the fuel supply path 2 and the air pressure loss $\Delta p_{ca}$ due to the air supply path 3. This control method, which aims at minimizing the total pressure loss $\Delta P_{total}$ by adjusting the air supply ratio ($m_{an}:m_{ca}$), enables to reduce power consumption by the air blower taking atmospheric air into the air supply path 3, thus resulting in higher efficiency of the system as a whole.

Although several embodiments of this invention has been explained up to this position, they should be considered to represent only a fraction of possible applications of this invention, and the technical scope of this invention should not be considered to be limited by the specific configurations thereof.

Although each embodiment in this document is explained as an independent entity, a new embodiment may be implemented by combining preferable features thereof.

The invention claimed is:

1. A fuel cell system configured to warm up a plurality of fuel cell stacks by providing heated air thereto during a start-up period, comprising:
    the plurality of fuel cell stacks;
    a fuel supply path connected in parallel to the fuel cell stacks and configured to connect a fuel source to the fuel cell stacks;
    an air supply path connected in series to the fuel cell stacks and configured to connect an air source to the fuel cell stacks;
    a heat exchanger arranged in the fuel supply path;
    an air heat exchanger arranged in the air supply path;
    a connection path branching from a position of the air supply path upstream of the air heat exchanger and connecting to a position of the fuel supply path upstream of the heat exchanger;
    a first control valve arranged in a position of the air supply path, the first control valve controlling air flowing into the air heat exchanger;
    a second control valve arranged in the connection path, the second control valve controlling air flowing into the heat exchanger; and
    a controller programmed to control the first control valve and the second control valve; wherein:
        the controller is programmed to control opening amounts of the first and second control valves so that a start-up control of the fuel cell stacks is performed in response to receiving a system startup command of the fuel cell system, the start-up control comprising supplying heated air to the fuel cell stacks through both the air supply path and the fuel supply path.

2. A fuel cell system according to claim 1, further comprising a temperature sensor configured to obtain a detected temperature for each of the fuel cell stacks, wherein:
    the controller is programmed to adjust the opening amounts of the first and second control valves based on the detected temperature.

3. A fuel cell system according to claim 1, further comprising:
    a bypass branching off from a position in the connection path or the air supply path, the position being upstream of the air heat exchanger, wherein:
    the bypass is provided with a third control valve for controlling a supply of the air, the air being supplied to the fuel cell stacks without passing through the air heat exchanger during the start-up period of the fuel cell system.

4. A fuel cell system according to claim 3, wherein:
    the controller is programmed to:
        until a time when a first fuel cell stack reaches a prescribed temperature during the start-up period of fuel cell system, control the opening amounts of the first and second control valve so that a rate of temperature increase of the first fuel cell stack becomes a highest rate of temperature increase of the fuel cell stacks, the first fuel cell stack being arranged closest of the fuel cell stacks to the air heat exchanger; and
        from the time when the temperature of the first fuel cell stack reaches the prescribed temperature, control an opening amount of the third control valve to maintain a heat dissipation from the first fuel cell stack to the air flowing in from the air supply path such that the heat dissipation is equal to or greater than a heating amount provided to the first fuel cell stack by the air flowing in from the fuel supply path.

5. A fuel cell system according to claim 3, wherein:
    the controller is programmed to:
        until a time when the first fuel cell stack located closest to the air heat exchanger reaches a prescribed temperature during the start-up period of fuel cell system,
        in response to a heat input to the heat exchanger being greater than a heat input to the air heat exchanger, control the opening amounts of the first and second control valves to maintain an air supply ratio equal to or greater than a value calculated by dividing the number of fuel cell stacks by a heat input ratio, the air supply ratio being an air amount supplied to the air heat exchanger divided by a total air amount supplied to the heat exchanger and the air heat exchanger, the heat input ratio being the heat input to the heat exchanger divided by a total heat input to the heat exchanger and the air heat exchanger,
        in response to the heat input to the heat exchanger being smaller than the heat input to the air heat exchanger, control the opening amounts of the first and second control valves to maintain the air supply ratio equal to or greater than the heat input ratio; and
        from the time when the temperature of the first cell stack reaches the prescribed temperature, control an opening amount of the third control valve to maintain a heat dissipation from the first fuel cell stack to the air supplied from the air supply path such that the heat dissipation is equal to or greater than a heating amount provided by the air supplied from the fuel supply path to the first fuel cell stack.

6. A fuel cell system according to claim 4, wherein the controller is further programmed to control the opening amounts of the first, second, and third control valves to maintain the following two values mutually equal:
  an air supply ratio of the heat exchanger divided by a total air amount supplied into the heat exchanger and the air heat exchanger under the condition that the third control valve is closed; and
  the air supply ratio of the heat exchanger divided by a total air amount supplied into the heat exchanger, the air heat exchanger, and the bypass under the condition that the third control valve is opened.

7. A fuel cell system according to claim 4, wherein:
  the controller is programmed to:
    until the time when the first fuel cell stack reaches the prescribed temperature during the start-up period of the fuel cell system, control the opening amounts of the first and second control valves to minimize a total pressure loss, which is a sum of an air pressure loss due to the fuel supply path and an air pressure loss due to the air supply path.

8. A control method of a fuel cell system having a plurality of fuel cell stacks, the control method comprising:
  providing the plurality of fuel cell stacks;
  providing a fuel supply path connected in parallel to the fuel cell stacks and configured to connect a fuel source to the fuel cell stacks;
  providing an air supply path connected in series to the fuel cell stacks and configured to connect an air source to the fuel cell stacks;
  providing a heat exchanger arranged in the fuel supply path;
  providing an air heat exchanger arranged in the air supply path;
  providing a connection path branching from a position of the air supply path upstream of the air heat exchanger and connecting to a position of the fuel supply path upstream of the heat exchanger;
  providing a first control valve arranged in a position of the air supply path, the first control valve controlling air flowing into the air heat exchanger;
  providing a second control valve arranged in the connection path, the second control valve controlling air flowing into the heat exchanger; and
  controlling, by a controller, opening amounts of the first and second control valves to supply heated air to the fuel cell stacks through both the air supply path and the fuel supply path.

* * * * *